J. B. STRAUSS.
CHUTE.
APPLICATION FILED MAY 19, 1913.
1,132,228.
Patented Mar. 16, 1915.
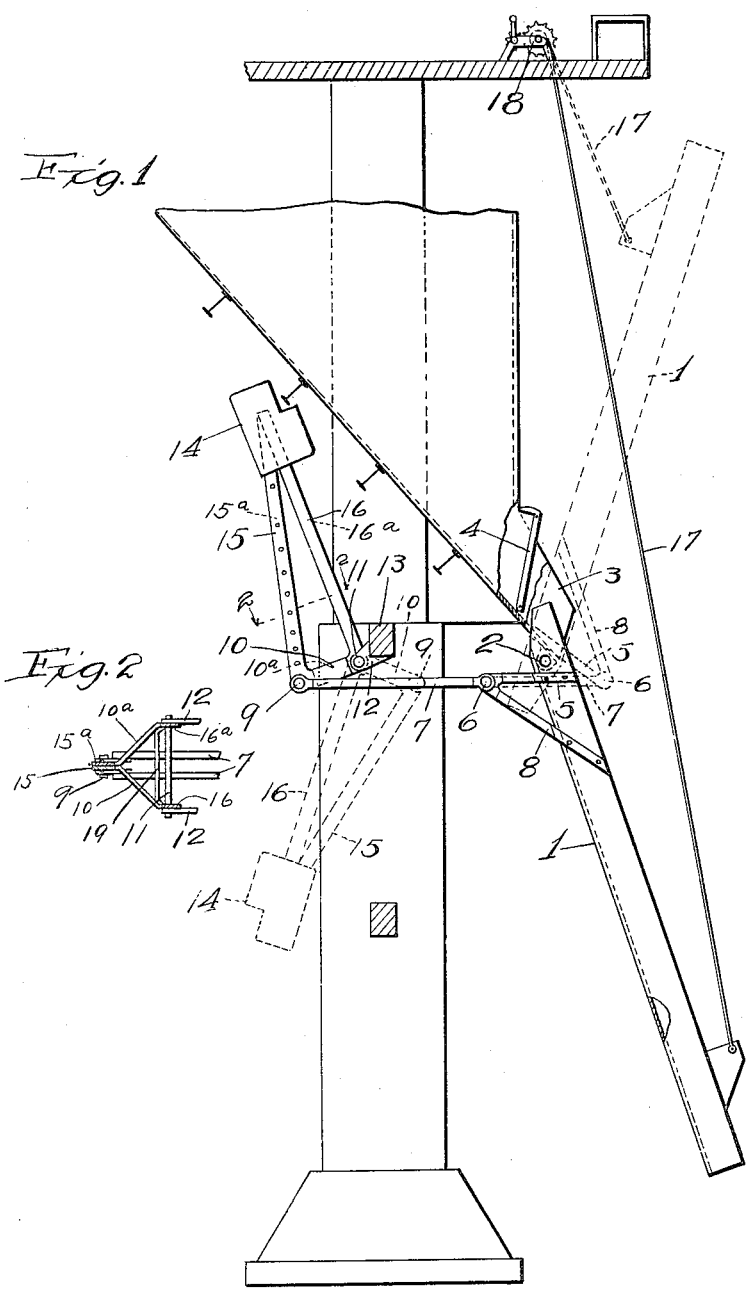
Inventor
Joseph B. Strauss.

UNITED STATES PATENT OFFICE.

JOSEPH B. STRAUSS, OF CHICAGO, ILLINOIS.

CHUTE.

1,132,228.             Specification of Letters Patent.             Patented Mar. 16, 1915.

Application filed May 19, 1913.   Serial No. 768,438.

*To all whom it may concern:*

Be it known that I, JOSEPH B. STRAUSS, a citizen of the United States, residing at Chicago, in the county of Cook and State of Illinois, have invented a certain new and useful Improvement in Chutes, of which the following is a specification.

This invention relates to improvements in chutes and has for its object to provide a new and improved device of this description, by means of which chutes for conveying grain, ore, coal or other material from one point to another may be effectively and economically counterbalanced so that such chutes may be easily and quickly moved from one position to another.

The invention is illustrated in the accompanying drawing wherein—

Figure 1 shows a diagrammatic view of one form of chute and counterbalancing device. Fig. 2 is a sectional view taken on line 2—2 of Fig. 1.

For purpose of illustration, I have shown a chute 1 of the kind usually employed on docks for loading vessels. This chute is pivoted at 2 to a fixed part upon which it is supported. The material is confined in a suitable receptacle and is discharged through a part 3 into the chute, the discharge being controlled by a door 4. Connected with the chute 1 is an arm 5 pivoted at 6 to an arm 7. The arm has connected therewith a brace 8 which is also connected with the chute. The arm 7 is pivotally connected at 9 with an arm 10 which is substantially parallel with a line drawn through the pivots 2 and 6. The arm 10 is pivoted at 11 to a suitable support. As herein shown, a supporting piece 12 is provided to which the arm 10 is pivoted, said supporting piece being fastened to a girder 13. The arm 7 is parallel with a line passing through the pivot 11 and through the pivot 2 about which the chute 1 moves. A counterweight 14 is connected to an arm 15 which is connected to the arm 10 so that the weight of the counterweight tends to act through said arms to lift the chute. In the drawing, I have shown a brace 16 associated with the arm 15. Any suitable operating mechanism may be used in connection with the chute for moving it to its various positions, such as for example, the flexible piece 17, which passes around a rotating drum 18 operated by any suitable mechanism. The counterweight may be of concrete or any other suitable material.

In the operation of the device, the chute when not in use is lifted up to the position shown in dotted lines in the drawing. The counterbalancing device is preferably arranged so that the chute is not exactly counterbalanced but will move downwardly when the cable 17 is slacked so that it can be moved in any desired position. When it is desired to use the chute, the drum 18 is rotated so as to unwind the cable 17 and the chute is lowered to the position shown in full lines in the drawing, the counterweight and associated parts taking the position also shown in full lines. When it is again desired to move the chute to its inoperative position, the drum 18 is rotated so as to wind up the cable 17, the only power required being to overcome the friction and the small excess weight of the chute required to cause it to descend when the cable 17 is slacked. It will be seen therefore that this chute can be easily and quickly handled by means of a very small amount of power.

The construction shown is preferably adapted for a chute system for bins, and it will be noted that the chute is pivoted at the front to the bin support and that the counterweight frame is connected by a rigid strut to a chute, the counterweight fitting into a space adapted to receive it under the floor of the bin. The part supporting the counterweight in the construction shown in the drawings forms a frame comprising three triangular frames connected together at an apex, the counterweight connected to the frame at the apex. These three triangular frame pieces will be clearly shown by examining Fig. 2. One frame piece for example is composed of the pieces 15, 16 and 10, the frame pieces on the other side being composed of the pieces $15^a$, $16^a$ and $10^a$, and the third frame piece 19 connects the other two frame pieces (see Fig. 2). The counterweight being of concrete, is made separately and slipped on to the apex, as shown in Fig. 1, and fastened to the said frame.

I claim:

1. The combination with a chute of a support to which it is pivoted, an arm connected to said chute at one side of said pivotal point, a second arm to which said first arm is pivotally connected, a third arm to which said second arm is pivotally connected, said third arm pivotally connected to a suitable support and a counterweight connected with said third arm.

2. The combination with a chute of a support to which it is pivoted, an arm connected to said chute at one side of said pivotal point, a second arm to which said first arm is pivotally connected, a third arm to which said second arm is pivotally connected, said third arm pivotally connected to a suitable support and a counterweight connected with said third arm, said second arm being substantially parallel with a line passing through the pivotal point of the chute and the pivotal point where the third arm is connected to the support, said third arm being substantially parallel with a line drawn through the pivotal point of the chute and the pivotal connection between the first and second arm.

3. The combination with a chute of a support with which it is pivotally connected, an arm connected with said chute, a counterweight, an arm connected therewith and an arm pivotally connecting said latter arm and the arm attached to the chute.

4. The combination with a chute of a support with which it is pivotally connected, an arm connected with said chute, a counterweight, an arm connected therewith and an arm pivotally connecting said latter arm and the arm attached to the chute, said latter arms being in substantial alinement when the chute is in its maximum lowered position.

5. A counterbalancing device for chutes comprising a counterweight frame mounted behind the chute, a pivot upon which it is mounted, a counterweight associated with said frame and a strut connecting the counterweight frame to the chute so as to permit it to balance the weight of the chute in all its various positions the end of said strut farthest from the chute projecting past the pivot of the counterweight frame when the chute is in its maximum down position.

6. In a chute balance a counterweight frame comprising three triangular frames connected together, a counterweight at the apex of said frame, a pivoted support for said frame at its base, a rigid strut connected to the counterweight frame at one end and at the other to the chute.

7. A chute system for bins comprising a chute and a counterweight frame therefor, the chute and the counterweight frame separately pivoted on the bin support by pivots substantially in the same horizontal plane, a rigid strut connecting the chute and the counterweight frame, a counterweight on the counterweight frame to balance the weight of the chute.

8. In a chute system for bins, a chute pivoted at the front of the bins, a rigid counterweight frame, pivoted behind the chute pivot, a rigid link connecting the counterweight frame and the chute on a line parallel to the two pivots, and a counterwegiht near the extremity of the counterweight frame.

9. The combination with a chute of a part connected with the chute at different points along its length and projecting therefrom, an arm to which said part is pivotally connected, a counterweight arm movably connected with said arm and with a fixed support and a counterweight connected with said counterweight arm.

In testimony whereof, I affix my signature in the presence of two witnesses this 15th day of May 1913.

JOSEPH B. STRAUSS.

Witnesses:
DENIE A. WALTERS,
MINNIE SUNDFAR.

Copies of this patent may be obtained for five cents each, by addressing the "Commissioner of Patents. Washington, D. C."